Jan. 17, 1928.
M. W. STRICKLER
1,656,451
ANTITHEFT TIRE AND RIM HOLDER
Filed May 12, 1927
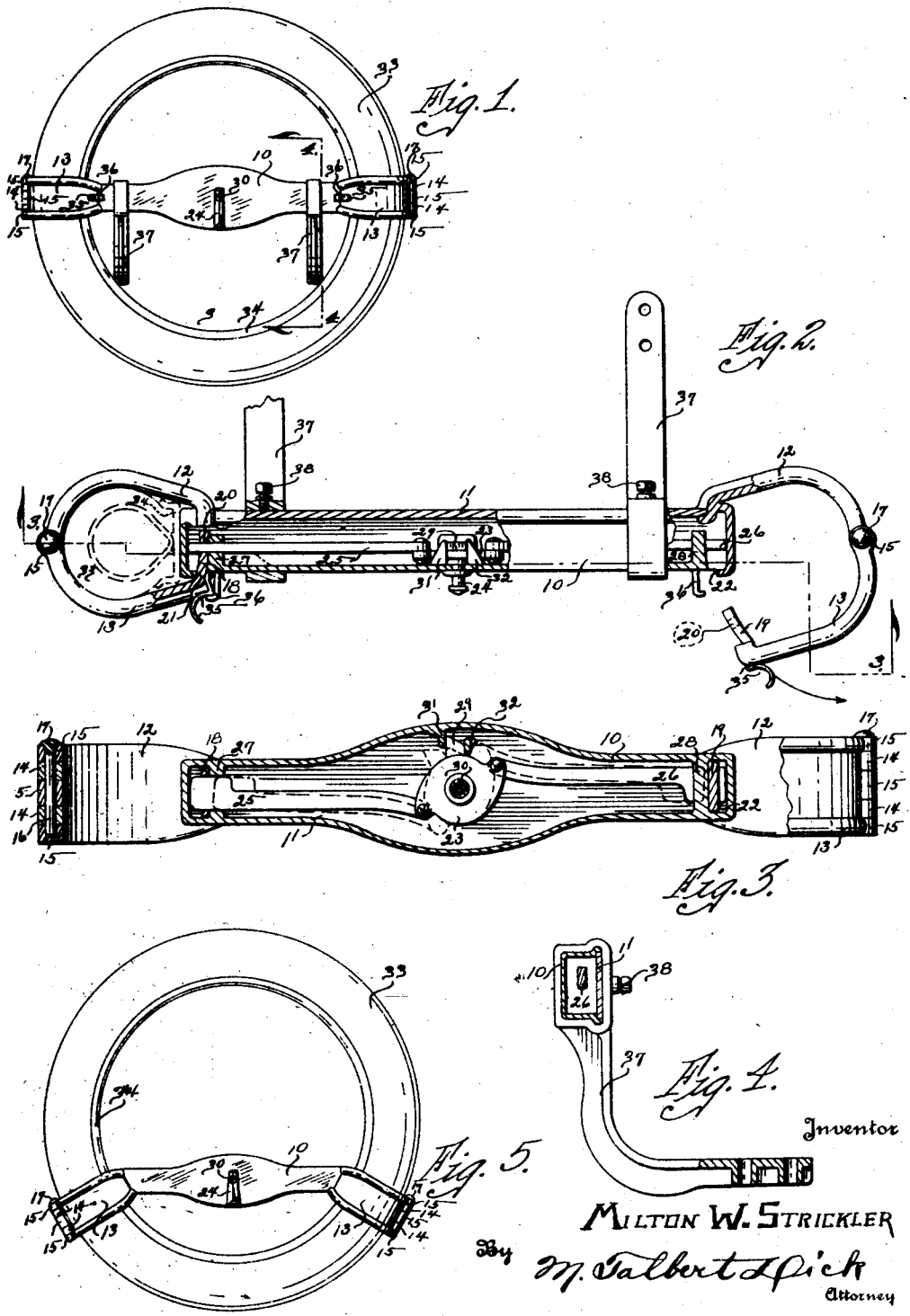
Inventor
MILTON W. STRICKLER
Attorney Patented Jan. 17, 1928.

1,656,451

UNITED STATES PATENT OFFICE.

MILTON W. STRICKLER, OF DES MOINES, IOWA.

ANTITHEFT TIRE AND RIM HOLDER.

Application filed May 12, 1927. Serial No. 190,799.

The principal object of this invention is to provide a tire and rim carrier that is theft proof.

More specifically, the object of this invention is to provide a tire and rim carrier comprising an elongated housing having hinged tire and embracing arms capable of being locked in closed position inside said housing.

A further object of this invention is to provide a tire and rim carrier that permits the ready removal or replacement of a tire and rim.

A still further object is to provide a tire and rim carrier having hinged tire and rim embracing arms that are simultaneously locked and unlocked by a single mechanism.

A still further object is to provide a tire and rim carrier having adjustable brackets that may be easily secured to any type of vehicle.

A still further object is to provide a tire and rim carrier for vehicles that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of my complete device carrying a rim and tire ready to be secured to a vehicle.

Fig. 2 is a top plan sectional view of my tire and rim carrier more fully illustrating its interior construction.

Fig. 3 is a side sectional view of a tire and rim carrier taken on line 3—3 of Fig. 2 and illustrates the internal locking mechanism.

Fig. 4 is a side sectional view of one of the brackets used for securing the device to a vehicle and is taken on line 4—4 of Fig. 1.

Fig. 5 is a side sectional view of a modified form of my tire and rim carrier.

One of the largest problems of the automobile owner and operator is the carrying of a spare tire and rim without the same being stolen. Many of the devices now on the market merely hold the spare rim, while it is an easy matter for a thief to remove the tire from the rim. Devices for preventing the theft of both rim and tire resort to padlocks that may be easily sawed or broken.

I have overcome these objections as will be appreciated by those familiar with the art.

I have used the numeral 10 to designate the elongated housing of my device, which may be made of any suitable metal having the back 11 permanently secured thereto by spot welding or the like. Integrally formed on each end of this housing is the fixed portions 12 of the tire and rim carrying and embracing arms. The numeral 13 designates the movable portion of each of the tire and rim embracing arms by being hinged to the fixed portion by ears 14 formed on the fixed portion and overlapping similar ears 15 formed on the movable portion and a hinge pin 16. In order that these pins will not be exposed to sawing or chiseling by a thief, they are completely inclosed as shown in Fig. 3 by not completely passing through the lower ear 15 and having the upper portion of the hole in the upper ear 15 through which the pin is placed, sealed by babbitt 17, spot welding, or the like. Integrally formed on the free end of each of the movable portions 13 is a projection which I have designated by the numerals 18 and 19 respectively each having a slot 20. The projection 18 is so designed as to pass into the housing 10 through the opening 21 when the tire and rim embracing arm to which the projection is secured is in a closed position. Likewise, the projection 19 is designed to pass into the housing 10 through the opening 22 when the embracing arm to which it is secured is in a closed position. Rotatably mounted in the housing and near its center is a lock 23 having the handle 24 extending through the housing for manually rotating the same. Having one of their ends pivoted to the lock 23 and at points diametrically opposite each other, are the bars 25 and 26 extending in opposite directions. By this construction, if the lock is rotated the bars will be reciprocated. The bar 25 passes through a guide 27 formed in the housing and is so arranged that if the projection 18 is within the housing 10 and the lock is rotated to the right, its free end will enter the slot 20, thereby preventing the withdrawal of the projection until the lock is rotated to the left. The bar 26 passes through a similar guide which I have designated by the numeral 28 formed in the housing and if the projection 19 is within the housing 10 and the lock is rotated to the right, its free end will enter the slot 20 in the projection 19 and will thereby hold that tire and rim embracing arm until released by rotating the lock to the left. I have designated the catch bar of the lock 23 by the numeral 29 which is actuated by a key placed in the lock through the key hole 30 in the handle member 24. The numeral 31 designates a lug integrally formed in the housing 10 and is so positioned as to engage the catch bar of the lock when the same is in extended position, thereby preventing the rotating of the lock to the left. The numeral 32 designates a second lug formed in the housing 10 designed to limit the rotating of the lock 23 beyond a certain point to the left and incidentally acts to prevent the rotation of the lock to the right when the catch bar is in an extended position.

By the above described description, it will readily be seen that to mount a tire 33 and rim 34 on my device, it is merely necessary to rotate the lock to the left until the bars 25 and 26 are free from the slots 20 in which condition the movable portions 13 of the embracing arms may be opened and the tire and rim placed in the same. To securely lock the tire and rim in the embracing arms, it is merely necessary to place the arms 13 in closed position, rotate the lock to the right until the bars 25 and 26 engage the openings 20 in the projections 18 and 19, place the appropriate key in the key hole 30 and actuate the catch bar until it engages the projection 31.

To yieldingly hold the embracing arms in a closed position until the catch bar 29 is extended by the key, I have provided for each of the arms, a spring catch member 35 each yieldingly engaging a hook 36 formed on the housing 10. The free end of each of these catch members extends outwardly in a curve to form a handle member to facilitate the opening and closing of the embracing arms.

The numeral 37 designates brackets for securing the device to a vehicle. The numeral 38 designates a set screw in each of these brackets for rigidly securing the device in the brackets. The brackets may be riveted to the chassis of the vehicle in the usual manner.

In Fig. 1 my device is so constructed as to receive and hold a rim and tire at approximately diametrically opposite sides, while in Fig. 5, I show a modified form of gripping the rim and tire at points below the horizontal plane of the rim and tire.

It will readily be understood by those skilled in the art that I have provided a tire and rim carrier that is handy and durable in use and theft-proof in every respect.

Some changes may be made in the construction and arrangement of my improved tire and rim holder without departing from the real spirit and purpose of my invention and it is my intention to cover by my claims any modified forms of structure or use of mechanical equivalents which may be reasonably included within their scope.

1. In a device of the class described, a housing, a tire and rim embracing arm at each end of said housing comprising a fixed portion permanently secured to said housing, a movable portion hinged to said fixed portion and capable of extending into said housing when in closed position, and bars slidably mounted in said housing and capable of engaging said portions extending within said housing.

2. In a device of the class described, a housing, a tire and rim embracing arms secured to each end of said housing, a projection on the free end of each of said arms each capable of entering an opening in said housing, a slot in each of said projections, and bars slidably mounted in said housing capable of engaging said slots for the purposes stated.

3. In a device of the class described, a housing, a tire and rim embracing arm hingedly secured to each end of said housing, a projection having a slot secured to the free end of each of said embracing arms and each capable of entering an opening in the housing when the arms are in closed position, a rotatably mounted member in said housing, two bars having one of their ends pivotally mounted to said rotatably mounted member capable of engaging said slots when the rotatably mounted member is rotated in one direction.

4. In a device of the class described, an elongated housing, a tire and rim embracing arm hingedly mounted at each end of said housing respectively, a projection having a slot formed on the free end of each of said embracing arms capable of extending into said housing when said arms are in a closed position, a rotatably mounted member in said housing, bars pivotally mounted to said rotatably mounted member capable of entering said slots when said rotatable member is rotated in one direction, and a locking means for preventing the rotation of said rotatably mounted member.

5. In a device of the class described, an elongated housing, brackets adjustably secured to said housing for securing the same to a vehicle, a tire embracing arm hingedly secured to each end of said housing, a spring catch member secured to each of said arms for yieldingly holding the same in a closed position, and locking mechanism inside said housing for locking said arms in a closed position.

6. In a device of the class described, an elongated housing, means of securing said housing to a vehicle, a hinged tire and rim embracing member secured to each end of said housing, a projection formed on the free end of each of said embracing members each capable of entering an opening in said housing, a rotatably mounted member in and near the center of said housing, two arms each having one of their ends pivotally mounted to said rotatably mounted member, extending in opposite directions and each capable of engaging the projection adjacent thereto when the embracing members are in a closed position and the rotatably mounted member is rotated in one direction, a handle member secured to said rotatably mounted member and terminating outside of said housing for manually rotating the same, and a locking mechanism for preventing the rotating of said handle.

MILTON W. STRICKLER.